United States Patent
Nasu et al.

(10) Patent No.: US 12,434,712 B2
(45) Date of Patent: Oct. 7, 2025

(54) VEHICLE MOTION CONTROL DEVICE AND VEHICLE MOTION CONTROL METHOD

(71) Applicant: Hitachi Astemo, Ltd., Ibaraki (JP)

(72) Inventors: Shingo Nasu, Tokyo (JP); Kentarou Ueno, Hitachinaka (JP); Masaru Yamasaki, Tokyo (JP)

(73) Assignee: Hitachi Astemo, Ltd., Ibaraki (JP)

( * ) Notice: Subject to any disclaimer, the term of this patent is extended or adjusted under 35 U.S.C. 154(b) by 121 days.

(21) Appl. No.: 18/265,804

(22) PCT Filed: Nov. 10, 2021

(86) PCT No.: PCT/JP2021/041347
§ 371 (c)(1),
(2) Date: Jun. 7, 2023

(87) PCT Pub. No.: WO2022/130842
PCT Pub. Date: Jun. 23, 2022

(65) Prior Publication Data
US 2024/0034328 A1    Feb. 1, 2024

(30) Foreign Application Priority Data

Dec. 17, 2020 (JP) .............................. 2020-209110

(51) Int. Cl.
*B60W 30/02* (2012.01)
*B60W 10/04* (2006.01)
(Continued)

(52) U.S. Cl.
CPC .......... *B60W 40/072* (2013.01); *B60W 10/04* (2013.01); *B60W 10/18* (2013.01);
(Continued)

(58) Field of Classification Search
CPC .... B60W 40/072; B60W 10/04; B60W 10/18; B60W 10/20; B60W 40/107;
(Continued)

(56) References Cited

U.S. PATENT DOCUMENTS

2003/0005765 A1* 1/2003 Brudis ................. B60W 40/00
73/488
2003/0055549 A1* 3/2003 Barta .................... B60W 10/20
701/1
(Continued)

FOREIGN PATENT DOCUMENTS

CN       103693042 A  *  4/2014  ......... B60W 30/182
DE    10 2017 124954 B3     4/2019
(Continued)

OTHER PUBLICATIONS

Extended European Search Report received in corresponding European Application No. 21906206.4 dated Oct. 21, 2024.
(Continued)

*Primary Examiner* — B M M Hannan
(74) *Attorney, Agent, or Firm* — Mattingly & Malur, PC

(57) ABSTRACT

The present invention provides a vehicle motion control device capable of reducing vibration generated in a running vehicle and suppressing the occurrence of an unstable behavior of the vehicle. A vehicle motion control device that controls a motion of a vehicle includes an operation management unit that generates traveling status information of the vehicle, a traveling track generation unit that generates a traveling track of the vehicle based on the traveling status information, and a travel control unit that controls driving, braking, and steering of the vehicle based on the traveling track. The traveling track generation unit includes a course planning unit that generates a target course based on the traveling status information and a speed planning unit that plans a target speed by calculating a longitudinal accelera-
(Continued)

tion and a lateral acceleration whose composite acceleration has one peak when the vehicle travels on each curve in the target course.

10 Claims, 5 Drawing Sheets

(51) Int. Cl.
    *B60W 10/18*          (2012.01)
    *B60W 10/20*          (2006.01)
    *B60W 40/072*        (2012.01)
    *B60W 40/107*        (2012.01)
    *B60W 40/109*        (2012.01)
    *G08G 1/16*           (2006.01)
    *B60W 30/045*        (2012.01)
    *B60W 30/182*        (2020.01)

(52) U.S. Cl.
    CPC .......... *B60W 10/20* (2013.01); *B60W 40/107* (2013.01); *B60W 40/109* (2013.01); *G08G 1/167* (2013.01); *B60W 30/045* (2013.01); *B60W 30/182* (2013.01); *B60W 2520/10* (2013.01); *B60W 2552/30* (2020.02); *B60W 2710/18* (2013.01); *B60W 2710/20* (2013.01); *B60W 2720/10* (2013.01)

(58) Field of Classification Search
    CPC ............ B60W 40/109; B60W 30/045; B60W 30/182; B60W 2520/10; B60W 2552/30; B60W 2710/18; B60W 2710/20; B60W 2720/10; B60W 30/02; B60W 2720/106; B60W 2720/125; B60W 30/143; B60W 30/18145; B60W 30/18163; B60W 60/0013; B60W 60/0021; B60W 60/0023; G08G 1/167
    USPC .......................................................... 701/23
    See application file for complete search history.

(56) References Cited

U.S. PATENT DOCUMENTS

| | | |
|---|---|---|
| 2010/0292904 A1 | 11/2010 | Taguchi et al. |
| 2012/0143398 A1* | 6/2012 | Takeuchi ............... B60W 40/12 |
| | | 701/1 |
| 2012/0143399 A1 | 6/2012 | Noumura et al. |
| 2012/0179342 A1* | 7/2012 | Noumura ............... B60W 10/06 |
| | | 701/54 |
| 2012/0221228 A1* | 8/2012 | Noumura ............... B60W 30/02 |
| | | 701/1 |
| 2013/0253815 A1 | 9/2013 | Orfila et al. |
| 2014/0052357 A1* | 2/2014 | Moebus ................. B60W 50/14 |
| | | 701/1 |
| 2016/0341555 A1* | 11/2016 | Laur ...................... G08G 1/164 |
| 2017/0235311 A1* | 8/2017 | Sekijima ............... B60W 50/12 |
| | | 701/25 |
| 2017/0361848 A1 | 12/2017 | Noto et al. |
| 2019/0061761 A1 | 2/2019 | Tsuchiya et al. |
| 2019/0196487 A1 | 6/2019 | Akiyama et al. |
| 2020/0180617 A1* | 6/2020 | Tezuka ................. B60W 30/14 |
| 2020/0189582 A1* | 6/2020 | Fukushige ............ B60W 30/10 |
| 2020/0391764 A1* | 12/2020 | Gotou ................. B60W 30/162 |

FOREIGN PATENT DOCUMENTS

| | | |
|---|---|---|
| JP | 2010-264820 A | 11/2010 |
| JP | 2013-218678 A | 10/2013 |
| JP | 2018-047828 A | 3/2018 |
| JP | 2019-038356 A | 3/2019 |
| WO | WO-2023139867 A1 * | 7/2023 |

OTHER PUBLICATIONS

International Search Report of PCT/JP2021/041347 dated Jan. 25, 2022.

* cited by examiner

VEHICLE MOTION CONTROL DEVICE AND VEHICLE MOTION CONTROL METHOD

TECHNICAL FIELD

The present invention relates to a vehicle motion control device that controls the motion of a vehicle and a vehicle motion control method.

BACKGROUND ART

As a type of vehicle motion control technology typified by driving assistance and automatic driving, there is known a technology of generating a traveling track including information such as a traveling route and a traveling speed to be traveling targets of a vehicle, and controlling a power train, a brake, a steering, and the like so that the vehicle travels along the traveling track. The simplest traveling route control is, for example, lane keeping control that sets the center of a lane as a traveling route.

Further, as a more advanced traveling route control technique, there is a technique disclosed in PTL 1. For example, claim 1 of PTL 1 describes a vehicle motion control device that "when calculating the traveling track on which the vehicle is turned to one of left and right and then continuously turned to the other, calculates the traveling track such that a peak value of curvature of the traveling track decreases as a vehicle speed of the vehicle is higher on the traveling track". In addition, claim 2 describes a vehicle motion control device "calculates a difference between a maximum value of a longitudinal/lateral composite acceleration of the vehicle while the vehicle turns to one of the left and right and a maximum value of a longitudinal/lateral composite acceleration of the vehicle while the vehicle turns to the other, . . . , and calculates the traveling track so that the difference is smaller than when the vehicle turns to the left and right along a point symmetrical track".

As described above, PTL 1 discloses a vehicle motion control device that targets the calculation of a traveling track on which a vehicle is turned to one of left and right and then continuously turned to the other, that is, a vehicle motion in a lane change (lane change) mode, and that suppresses the peak value of longitudinal/lateral composite acceleration of the vehicle and improves the stability of a vehicle behavior by calculating a traveling track so that the peak value of the curvature of the traveling track decreases as the vehicle speed of the vehicle at the time of lane change increases.

CITATION LIST

Patent Literature

PTL 1: JP 2018-047828 A

SUMMARY OF INVENTION

Technical Problem

However, the vehicle motion device of PTL 1 does not improve the ride comfort and comfortable feeling of the occupants by suppressing the number of peaks of the composite acceleration but permits that, for example, the number of peaks of the composite acceleration increases, the number of vibrations generated in the vehicle increases, and the behavior of the vehicle becomes unstable as a result of suppressing the peak value of the composite acceleration.

Therefore, an object of the present invention is to provide a vehicle motion control device and a vehicle motion control method which reduce the vibration generated in a vehicle and suppress the occurrence of the unstable behavior of the vehicle by suppressing the number of peaks of the composite acceleration of the vehicle.

Solution to Problem

In order to solve the above problem, a vehicle motion control device according to the present invention controls the motion of a vehicle and includes an operation management unit that generates traveling status information of the vehicle, a traveling track generation unit that generates the traveling track of the vehicle based on the traveling status information, and a travel control unit that controls driving, braking, and steering of the vehicle based on the traveling track. The traveling track generation unit includes a course planning unit that generates a target course based on the traveling status information and a speed planning unit that plans a target speed by calculating a longitudinal acceleration and a lateral acceleration whose composite acceleration has one peak when the vehicle travels on each curve in the target course.

Advantageous Effects of Invention

According to the vehicle motion control device and the vehicle motion control method of the present invention, the vibration generated in the vehicle can be reduced and the unstable behavior of the vehicle can be suppressed by suppressing the number of peaks of the composite acceleration of the vehicle. Problems, configurations, and effects other than those described above will be clarified by the following description of embodiments.

DESCRIPTION OF EMBODIMENTS

Figure 1:
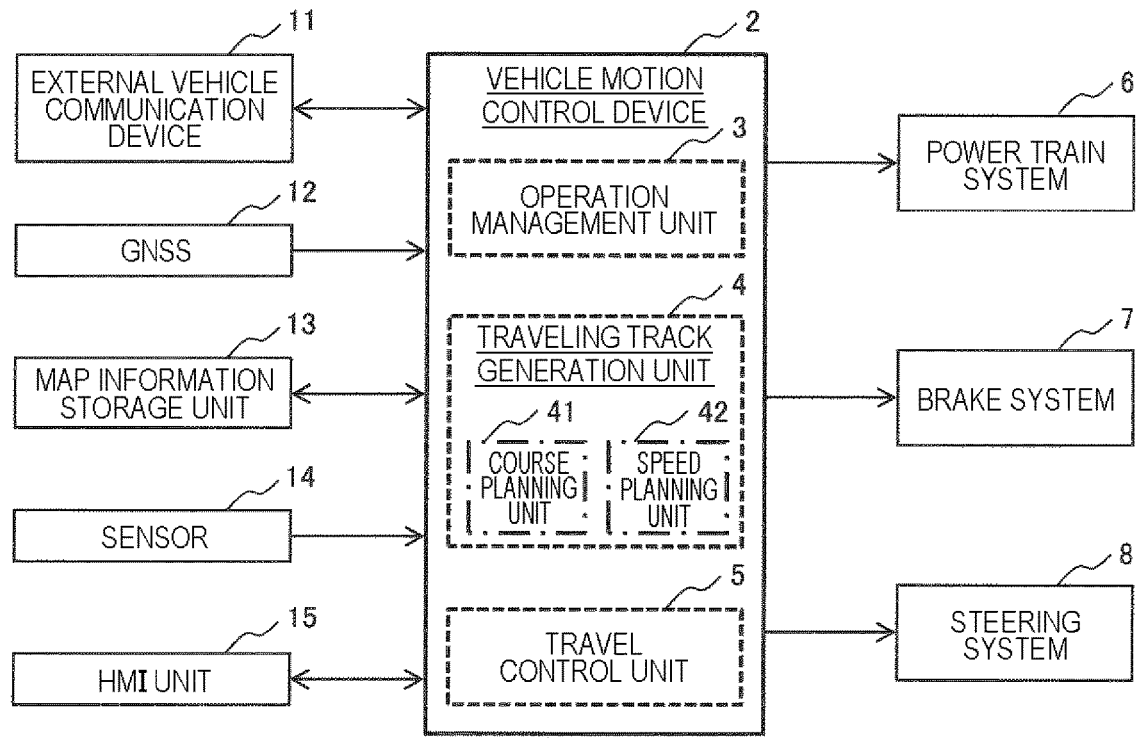
FIG. 1 is a functional block diagram of an in-vehicle system according to a first embodiment.

Hereinafter, embodiments of a vehicle motion control device and a vehicle motion control method according to the present invention will be described with reference to the accompanying drawings. Note that substantially the same or similar configurations are denoted by the same reference numerals, and in a case where descriptions thereof overlap, the description thereof may be omitted. In addition, a description of the well-known technique may be omitted.

First Embodiment

First, a vehicle motion control device 2 according to the first embodiment of the present invention will be described with reference to FIGS. 1 to 9B.

<In-Vehicle System 1>

FIG. 1 is a functional block diagram of an in-vehicle system 1 including the vehicle motion control device 2 of the present embodiment. The in-vehicle system 1 is a system that is mounted on a vehicle and executes vehicle motion control such as driving assistance and automatic driving. As illustrated in the drawing, the in-vehicle system 1 includes an external vehicle communication device 11, a global navigation satellite system (GNSS) 12, a map information storage unit 13, a sensor 14, a human machine interface (HMI) unit 15, the vehicle motion control device 2, a power train system 6, a brake system 7, and a steering system 8. These components will be sequentially described below.

<Information Source Group of Vehicle Motion Control Device 2>

The external vehicle communication device 11 executes vehicle-to-vehicle communication with another vehicle or road-to-vehicle communication with a roadside device by wireless communication and transmits and receives information concerning a vehicle, a surrounding environment, and the like.

The GNSS 12 receives a radio wave transmitted from an artificial satellite such as a quasi-zenith satellite or a global positioning system (GPS) satellite and acquires information such as the position of the vehicle (own vehicle).

The map information storage unit 13 stores general road information used in a navigation system or the like, road information having information related to curves such as the widths of roads and curvatures of roads, information such as road surface conditions and traffic conditions, and information concerning a vehicle, a surrounding environment, and the like which is information on the traveling statuses of other vehicles.

Note that the information concerning the vehicle, the surrounding environment, and the like is sequentially updated by information acquired by vehicle-to-vehicle communication or road-to-vehicle communication via the external vehicle communication device 11.

The sensor 14 is an external recognition sensor such as an image sensor, a millimeter-wave radar, or LiDAR that detects information concerning the vehicle, the surrounding environment, and the like, or a sensor that detects information concerning an operation by a driver, the speed, acceleration, jerk, and angular velocity of the vehicle, the steering angle of a wheel, and the like. The information concerning the vehicle, the surrounding environment, and the like detected by the external recognition sensor is, for example, information of various objects such as an obstacle, a sign, a lane boundary, a lane outside line, a building, a pedestrian, and another vehicle present around the own vehicle. Furthermore, the sensor 14 recognizes, for example, a lane boundary line, a lane outside line, and the like on the basis of the difference between a white line of image data captured by the image sensor and luminance of a road surface.

The HMI unit 15 displays, on a display, information required by the user from information received by an input operation of the user, such as the selection of a traveling mode or the setting of a destination, information acquired by the external vehicle communication device 11, the GNSS 12, and the sensor 14, and information recorded in the map information storage unit 13, and provides voice guidance from a speaker. In addition, the HMI unit 15 generates an alarm for calling the user's attention.

In this case, the traveling mode includes, for example, a comfort mode, an economy mode, and a sports mode and is arbitrarily set by the user, or is set in advance by the user, or is set by the operation management unit 3 (to be described later) on the basis of the traveling status information, and the speed, acceleration, jerk, and the like of the vehicle are set. That is, the upper limit value of the behavior of the vehicle changes depending on the traveling mode. In addition, the traveling mode includes a shortest time mode for minimizing the moving time, a shortest distance mode for minimizing the moving distance, and the like.

<Vehicle Motion Control Device 2>

As illustrated in FIG. 1, the vehicle motion control device 2 includes an operation management unit 3, a traveling track generation unit 4, and a travel control unit 5, and the traveling track generation unit 4 includes a course planning unit 41 and a speed planning unit 42. Specifically, the vehicle motion control device 2 is an electronic control unit (ECU) that includes an arithmetic device such as a central processing unit (CPU), a main storage device such as a semiconductor memory, an auxiliary storage device, and hardware such as a communication device, and integrally controls the vehicle, and implements various functions of the operation management unit 3 and the like by executing programs loaded into the main storage device by the arithmetic device. Note that, in the present embodiment, for convenience of explanation, the operation management unit 3, the traveling track generation unit 4, and the travel control unit 5 have separate configurations, but do not necessarily have separate configurations, and when these units are used for an actual vehicle, various functions of these units may be implemented by a higher-level controller.

The operation management unit 3 generates information regarding the behavior of the vehicle such as information regarding the position of the host vehicle, information regarding various objects existing around the host vehicle (information regarding the vehicle, the surrounding environment, and the like), lateral acceleration, yaw rate, and lateral jerk on the basis of the information acquired by the external vehicle communication device 11, the GNSS 12, and the sensor 14 and the information recorded in the map information storage unit 13. In addition, the operation management unit 3 periodically transmits the information of the position of the host vehicle, the information of various objects, and the information of the behavior of the vehicle to other vehicles and roadside devices via the external vehicle communication device 11 and also transmits the information to the map information storage unit 13 to sequentially update the information stored in the map information storage unit 13. Further, the operation management unit 3 sets the information of the route from the current position of the vehicle to the destination on the basis of the information of the position of the host vehicle, the information of various objects, the information of the behavior of the vehicle, and the information received by the HMI unit 15 (for example, a traveling mode or a destination). Hereinafter, the information generated or set by the operation management unit 3 may be referred to as "traveling status information".

On the basis of the traveling status information input from the operation management unit 3, the traveling track generation unit 4 generates, in the course planning unit 41, a route (hereinafter referred to as a "target course P") to be a travel target when the vehicle travels on the road, and generates, in the speed planning unit 42, a speed (hereinafter referred to as a "target speed") to be a travel target when the vehicle travels on the road. Then, a traveling track including information such as the target course P and the target speed is output. Note that details of the speed planning unit 42 will be described later.

The travel control unit 5 sets a target driving force, a target braking force, a target steering angle, and the like so that the vehicle travels following the traveling track output from the traveling track generation unit 4 and controls the power train system 6, the brake system 7, and the steering system 8.

<Control Target Group of Vehicle Motion Control Device 2>

The power train system 6 controls the driving force generated by an internal combustion engine, an electric motor, or the like on the basis of an operation by a driver or the target driving force output from the travel control unit 5.

The brake system 7 controls the braking force generated by a brake caliper or the like based on an operation by a driver or the target braking force output from the travel control unit 5.

The steering system 8 controls the steering angle of the wheel based on an operation by the driver and the target steering angle output from the travel control unit 5.

<Speed Planning Unit 42>

Figure 2:
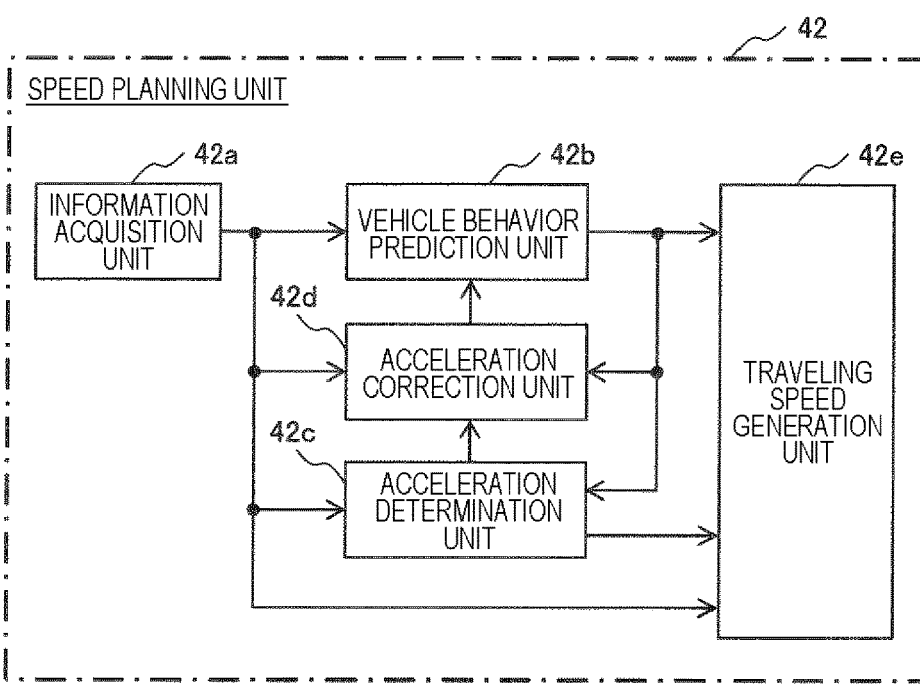
FIG. 2 is a functional block diagram of a speed planning unit according to the first embodiment.

Next, details of the speed planning unit 42 will be described with reference to FIG. 2. FIG. 2 is a functional block diagram of the speed planning unit 42. The speed planning unit 42 generates the target speed of the vehicle on the basis of the position and speed of the vehicle, the upper limit value of the behavior, the target course P, and the like and includes an information acquisition unit 42a, a vehicle behavior prediction unit 42b, an acceleration determination unit 42c, an acceleration correction unit 42d, and a traveling speed generation unit 42e. These components will be sequentially described below.

The information acquisition unit 42a acquires traveling status information from the operation management unit 3 and the target course P from the course planning unit 41 and outputs them to each unit in the speed planning unit 42.

The vehicle behavior prediction unit 42b predicts the behavior of the vehicle at each point present on the traveling route when traveling on the target course P based on the traveling status information from the information acquisition unit 42a, the target course P, and an acceleration correction value from the acceleration correction unit 42d to be described later. In addition, the vehicle behavior prediction unit 42b predicts and outputs the behavior of the vehicle equal to or less than the upper limit value that changes depending on the traveling mode set by the driver or the like or an acceleration correction value from the acceleration correction unit 42d.

Based on the traveling status information and the target course P from the information acquisition unit 42a and the vehicle behavior prediction value from the vehicle behavior prediction unit 42b, the acceleration determination unit 42c determines whether or not there is one peak of the composite acceleration when traveling on one curve and outputs a determination result (information). Note that the composite acceleration used here is the magnitude of a resultant vector of accelerations generated in the vehicle and is, for example, the square root of the sum of squares of the longitudinal acceleration and the lateral acceleration generated in the vehicle in the case of the planar motion of the vehicle. A peak of the composite acceleration is the maximum value of the composite acceleration generated when the vehicle travels on one curve. Note that the peak here includes a peak at which the acceleration maintains a maximum value for a predetermined time on the acceleration graph and which is in a flat state.

In order to determine whether there is one peak of the composite acceleration when traveling on one curve, the acceleration determination unit 42c first extracts each inflection point I of the curvature of the target course P and then defines a section sandwiched by the preceding and subsequent inflection points I as one curve. Then, the number of curves (information) present in the traveling direction of the vehicle is detected, and information such as the length, width, curvature, turning direction, start point, and end point of the curve is calculated and output for each detected curve. Hereinafter, the curvature that forms a peak or an inflection point within one curve may be referred to as "peak curvature".

The acceleration correction unit 42d calculates an acceleration correction value on the basis of the traveling status information and the target course P from the information acquisition unit 42a, the vehicle behavior prediction value from the vehicle behavior prediction unit 42b, and the determination result (information) from the acceleration determination unit 42c. The acceleration correction value is a value equal to or less than the upper limit value obtained by increasing or decreasing the controllable acceleration of the vehicle calculated only when there is not one peak of the composite acceleration in one curve or changing the shape of the acceleration, and, for example, the magnitude of the longitudinal acceleration generated in the vehicle may be set to a predetermined ratio to the lateral acceleration such that there is one peak of the composite acceleration in one curve.

The traveling speed generation unit 42e sets a speed (traveling speed) at each point present on the traveling route only when there is one peak of the composite acceleration on the basis of the traveling status information and the target course P from the information acquisition unit 42a, the vehicle behavior prediction value from the vehicle behavior prediction unit 42b, and the determination result (information) from the acceleration determination unit 42c.

<First Traveling Route>

Next, a situation in which a vehicle V travels on the first traveling route will be described with reference to FIGS. 3 to 5.

Figure 3:
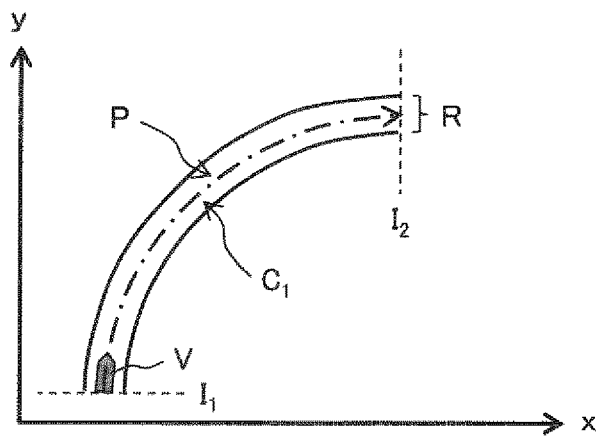
FIG. 3 is a plan view of a first traveling route.

FIG. 3 is a plan view of the first traveling route, exemplarily showing the target course P set within the range of a travelable region R where the vehicle V can travel without contacting any obstacles, pedestrians, buildings, other vehicles, or the like. Since an inflection point $I_1$ exists at the start point of the right turn and an inflection point $I_2$ exists at the end point on the target course P, the acceleration determination unit 42c defines a section from the inflection point $I_1$ to the inflection point $I_2$ as one curve $C_1$. Note that, in FIG. 3, the target course P is a route for traveling at the center of the travelable region R. However, if the target course P is within the range of the travelable region R, for example, the target course P having a peak curvature smaller than the peak curvature of the road shape may be set.

Next, the behavior of the vehicle V in FIG. 3 in a conventional case is compared with the behavior of the vehicle in this embodiment when the vehicle travels on the curve $C_1$ of the first traveling route in a so-called "slow-in, first-out" manner.

Figure 4A:
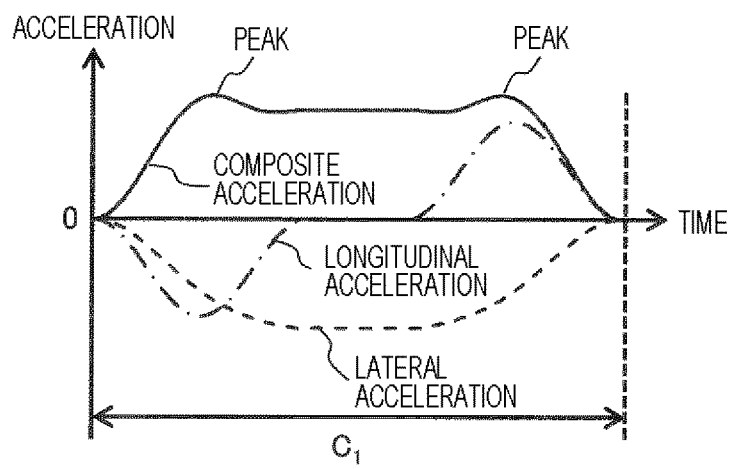
FIG. 4A is an acceleration graph when conventional control is used during traveling on a first traveling route.
Figure 4B:
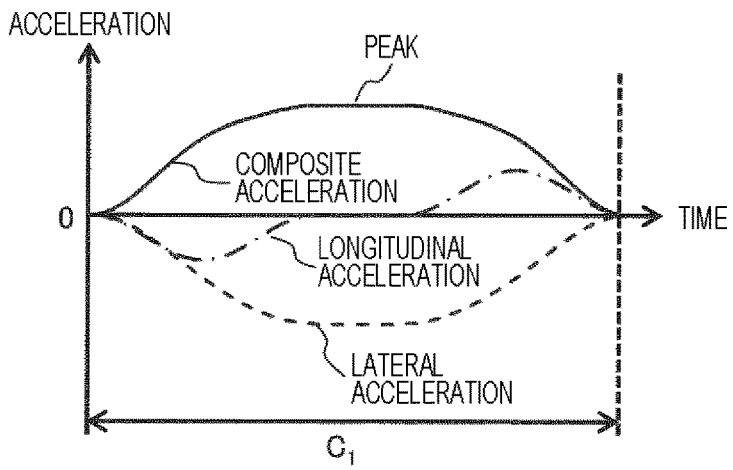
FIG. 4B is an acceleration graph when control according to the first embodiment is used during traveling on a first traveling route.

FIG. 4A is an acceleration graph when the conventional control is used for the vehicle V in FIG. 3, and FIG. 4B is an acceleration graph when the control of the first embodiment is used for the vehicle V in FIG. 3. Referring to FIGS. 4A and 4B, each chain line indicates the longitudinal acceleration of the vehicle V, each broken line indicates the lateral acceleration of the vehicle V, and each solid line indicates the composite acceleration which is the square root of the sum of squares of the longitudinal acceleration and the lateral acceleration.

As indicated by the longitudinal acceleration (chain line) in FIG. 4A, when the vehicle V decelerates near the entrance of the curve $C_1$ and accelerates near the exit, in the conventional control for suppressing the peak value of the composite acceleration (solid line), not only the peak of the composite acceleration occurs twice near the entrance and the exit of the curve Cu but also acceleration changes near the respective peaks become steep.

On the other hand, as illustrated in FIG. 4B, according to the acceleration control of the present embodiment, by setting the peak value of the absolute value of the longitudinal acceleration (chain line) to be smaller than the peak value of the absolute value of the lateral acceleration (broken line), not only the peak of the composite acceleration (solid line) becomes one near the center of the curve Cu but also the acceleration change near the peak becomes gentle.

Therefore, according to the present embodiment, it can be seen that not only the number of peaks of the composite acceleration can be reduced from two to one, but also the change in acceleration can be mitigated. That is, when the acceleration control of the present embodiment is adopted, the number of vibrations generated in the vehicle V traveling on the curve $C_1$ is reduced as compared with the conventional method, and the occurrence of unstable behavior of the vehicle can be suppressed, so that the ride comfort of the occupants is improved. Referring to FIG. 4B, the sinusoidal waveform is exemplified as the shape of the longitudinal acceleration control of the first embodiment, but for example, the shape may be a rectangular waveform or a trapezoidal waveform.

Figure 5:
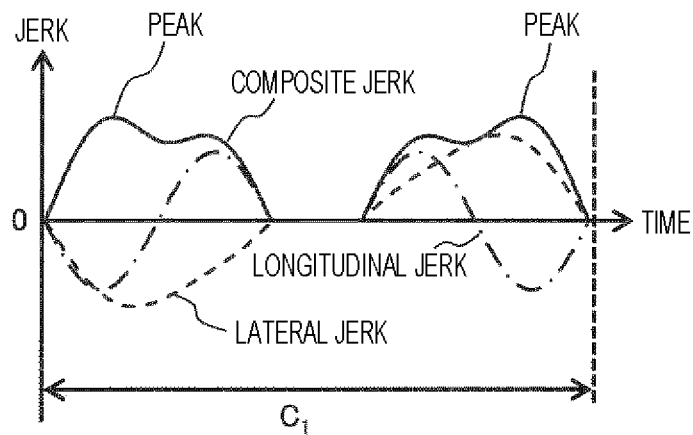
FIG. 5 is a jerk graph when control according to the first embodiment is used during traveling on a first traveling route.

FIG. 5 is a graph illustrating the jerk generated in the vehicle V when the acceleration control of FIG. 4B is executed. Note that the longitudinal jerk and the lateral jerk illustrated in FIG. 5 are temporal changes in longitudinal acceleration and lateral acceleration illustrated in FIG. 4B, and the composite jerk illustrated in FIG. 5 is the square root of the sum of squares of the longitudinal jerk and the lateral jerk.

In a case where the number of peaks of the composite acceleration is set to one as illustrated in FIG. 4B, by minimizing the peak value of the composite jerk in FIG. 5, the vibration generated in the vehicle V traveling on the curve $C_1$ is further reduced, and the occurrence of the unstable behavior of the vehicle V can be further suppressed. As illustrated in FIG. 5, the shape of the longitudinal jerk according to the first embodiment is a sinusoidal waveform, but may be, for example, a rectangular waveform or a trapezoidal waveform, and the peak value of the composite jerk can be reduced by forming the shape of the longitudinal acceleration or the longitudinal jerk into a rectangular waveform or a trapezoidal waveform.

<Second Traveling Route>

Next, a situation where the vehicle V travels on the second traveling route will be described with reference to FIGS. 6 and 7.

Figure 6:
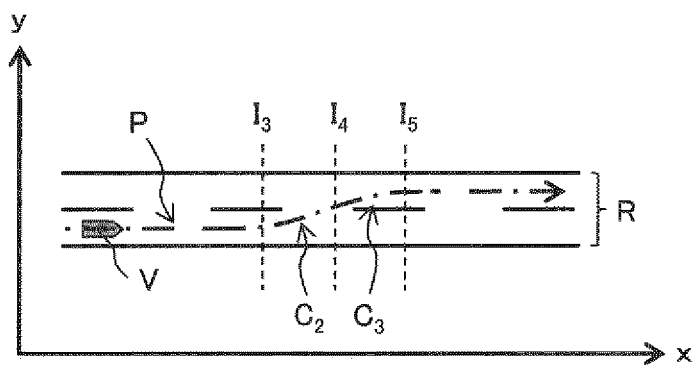
FIG. 6 is a plan view of a second traveling route.

FIG. 6 is a plan view of the second traveling route, exemplarily showing the target course P set within the range of the travelable region R when the vehicle V changes lanes between two adjacent straight paths. Since the inflection points $I_3$, $I_4$, and $I_5$ exist between the start point and the end point of the lane change on the target course P, the acceleration determination unit 42c defines a left turn section from the inflection point $I_3$ to the inflection point $I_4$ as one curve $C_2$, and defines a right turn section from the inflection point $I_4$ to the inflection point Is as another curve $C_3$.

Figure 7:
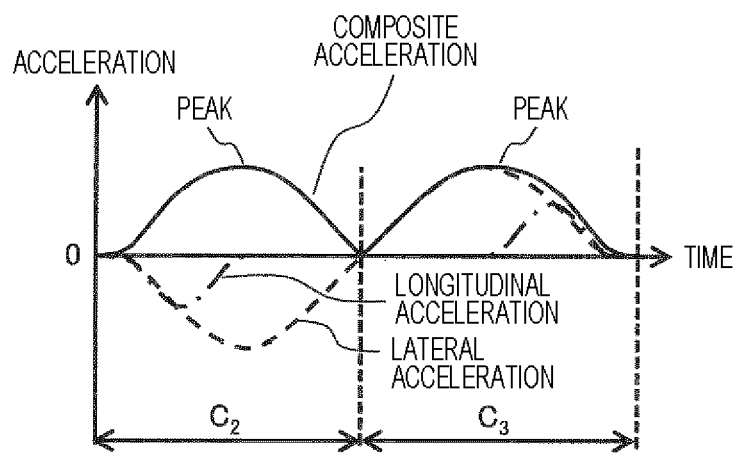
FIG. 7 is an acceleration graph when control according to the first embodiment is used during traveling on a second traveling route.

FIG. 7 is an acceleration graph when the control according to the present embodiment is used for the vehicle V in FIG. 6. As indicated by the longitudinal acceleration (chain line), the vehicle V using the control according to the present embodiment decelerates near the entrance of the first curve $C_2$ and accelerates near the exit of the next curve $C_3$. In this case, by making the peak value of the absolute value of the longitudinal acceleration (chain line) smaller than the peak value of the absolute value of the lateral acceleration (broken line), the number of peaks of the composite acceleration (solid line) can be made one even while the vehicle is traveling on either the curve $C_2$ or the curve $C_3$. Therefore, even at the time of lane change in which curves in opposite directions are continuous, the vibration generated in the vehicle V is reduced, and the occurrence of unstable behavior of the vehicle can be suppressed.

<Third Traveling Route>

Next, a situation in which the vehicle V travels on the third traveling route will be described with reference to FIGS. 8 to 9B.

Figure 8:
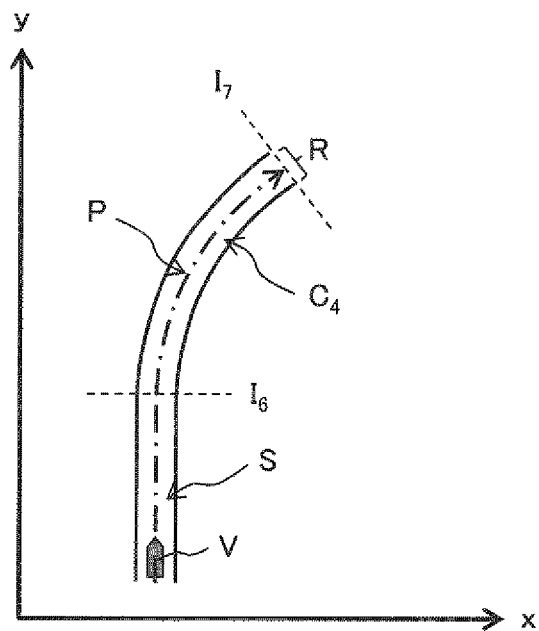
FIG. 8 is a plan view of a third traveling route.

FIG. 8 is a plan view of the third traveling route, exemplarily showing the target course P set within the range of the travelable region R of the vehicle V. Since an inflection point $I_6$ exists at the start point of the right turn and an inflection point $I_7$ exists at the end point on the target course P, the acceleration determination unit 42c defines a section up to the inflection point $I_6$ as a straight path S and defines a section from the inflection point $I_6$ to the inflection point $I_7$ as one curve $C_4$.

Figure 9A:
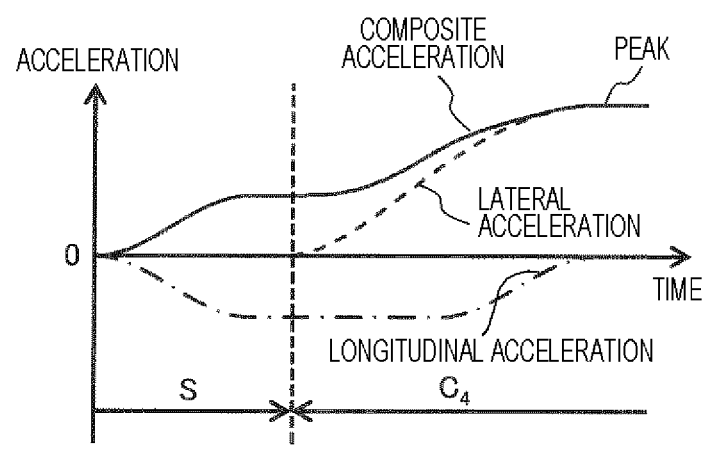
FIG. 9A is an acceleration graph when control according to the first embodiment is used during traveling on a third traveling route.

FIG. 9A is an example of an acceleration graph when the control according to the present embodiment is used for the vehicle V in FIG. 8. As indicated by the longitudinal acceleration (chain line), the vehicle V starts to decelerate from the current position on the straight path S and enters the curve $C_4$ while decelerating. At this time, by making the peak value of the absolute value of the longitudinal acceleration (chain line) smaller than the peak value of the absolute value of the lateral acceleration (broken line), the number of peaks of the composite acceleration (solid line) of the curve $C_4$ can be made one.

Figure 9B:
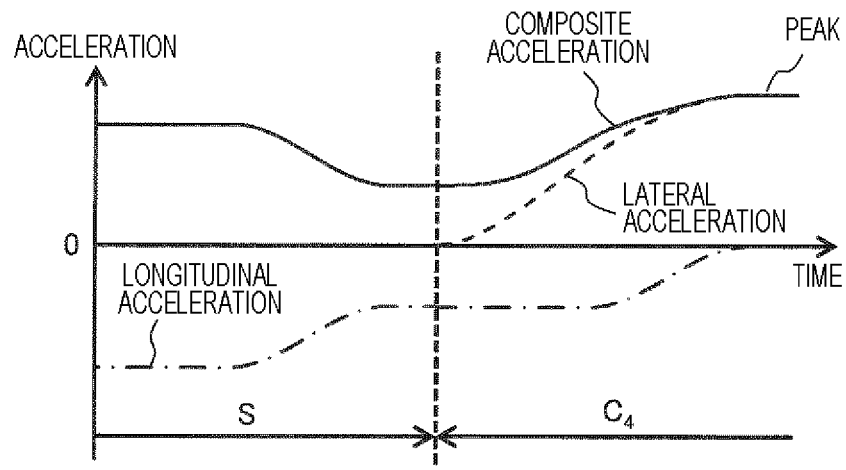
FIG. 9B is another example of the acceleration graph when control according to the first embodiment is used during traveling on the third traveling route.

FIG. 9B illustrates an acceleration graph when the vehicle V enters curve $C_4$ while decelerating more quickly and greatly than in FIG. 9A. In this case, the peak value of the absolute value of the longitudinal acceleration (chain line) is made smaller than the peak value of the absolute value of the lateral acceleration (broken line) before the vehicle V enters the curve $C_4$, so that the number of peaks of the composite acceleration (solid line) during passage through the curve $C_4$ can be made one.

As described above, according to the vehicle motion control device of the first embodiment, by controlling the relationship between the longitudinal acceleration and the lateral acceleration such that the number of peaks of the composite acceleration while the vehicle V is passing through each curve becomes one, the number of vibrations generated in the vehicle V can be reduced, and the occurrence of unstable behavior of the vehicle V can be suppressed. This improves the ride comfort and comfortable feeling of the occupants.

Second Embodiment

Next, a vehicle motion control device 2 according to the second embodiment of the present invention will be described with reference to FIG. 10. A redundant description of common points with the first embodiment will be omitted.

Figure 10:
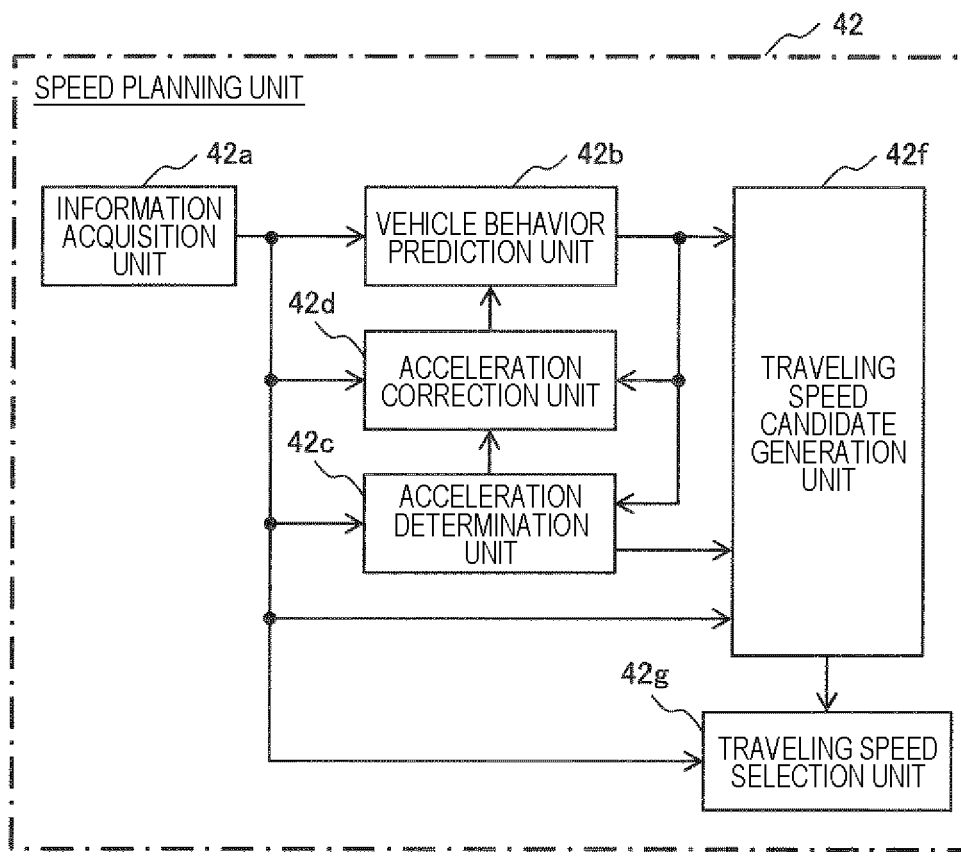
FIG. 10 is a functional block diagram of a speed planning unit according to the second embodiment.

FIG. 10 is a functional block diagram of a speed planning unit 42 according to the second embodiment. The speed planning unit 42 according to the present embodiment illustrated here is obtained by changing the traveling speed generation unit 42e to a traveling speed candidate generation unit 42f and adding a traveling speed selection unit 42g to the speed planning unit 42 according to the first embodiment illustrated in FIG. 2.

The traveling speed candidate generation unit 42f generates a plurality of target speed candidates whose composite acceleration has one peak on the basis of the traveling status information and the target course P from the information acquisition unit 42a, the vehicle behavior prediction value from the vehicle behavior prediction unit 42b, and the determination result (information) from the acceleration determination unit 42c and outputs the plurality of target speed candidates to the traveling speed selection unit 42g.

The traveling speed selection unit 42g selects one candidate as the target speed based on the current traveling mode (such as the shortest time mode or the economy mode) indicated by the traveling status information from the information acquisition unit 42a and the plurality of target speed candidates from the traveling speed candidate generation unit 42f and outputs the selected candidate to a travel control unit 5. For example, when the traveling status information indicates the shortest time mode, a target speed candidate corresponding to the shortest moving time is selected from among the plurality of target speed candidates generated by the traveling speed candidate generation unit 42f, and when the traveling status information indicates the economy mode, a target speed candidate corresponding to the smallest energy consumption is selected from among the plurality of target speed candidates. That is, the traveling speed selection unit 42g selects the target speed corresponding to the shortest moving time from the plurality of target speeds or selects the target speed corresponding to the minimum energy consumption from the plurality of target speeds.

As described above, according to the vehicle motion control device according to the second embodiment, not only the same effects as those of the first embodiment can be obtained, but also the vehicle motion can be controlled according to the selection of the traveling mode.

In addition, the present invention is not limited to above-described embodiments and includes various modifications.

For example, the above-described embodiment has been described specifically for easy understanding of the present invention, and is not necessarily limited to one having all the configurations described above. Further, part of the configuration of one embodiment can be replaced with part of the configuration of another embodiment. In addition, the configuration of another embodiment can be added to the configuration of a certain embodiment. In addition, part of the configuration of each embodiment can be deleted, and part of another configuration can be added and replaced with part of another configuration.

REFERENCE SIGNS LIST 1 in-vehicle system
11 external vehicle communication device
12 GNSS
13 map information storage unit
14 sensor
15 HMI unit
2 vehicle motion control device
3 operation management unit
4 traveling track generation unit
41 course planning unit
42 speed planning unit
42a information acquisition unit
42b vehicle behavior prediction unit
42c acceleration determination unit
42d acceleration correction unit
42e traveling speed generation unit
5 travel control unit
6 power train system
7 brake system
8 steering system
C curve
I inflection point
P target course
R travelable region
S straight path
V vehicle

The invention claimed is:

1. A vehicle motion control device that controls a motion of a vehicle, comprising:
a storage device storing at least one program; and
a controller including a processor (CPU) and which when executing the at least one program configures the controller to:
generate traveling status information of the vehicle;
generate a traveling track of the vehicle based on the traveling status information;
control driving, braking, and steering of the vehicle based on the traveling track including a target course and a target speed;
generate the target course based on the traveling status information;
plan the target speed by calculating a longitudinal acceleration and a lateral acceleration when the vehicle travels on each curve in the target course;
determine, based on the traveling status information, the target course and a vehicle behavior prediction value, whether or not there is one peak in a composite acceleration, which is a combination of the longitudinal acceleration and the lateral acceleration, when traveling on one curve and output a result of the determination; and
calculate, only when the result of the determination indicates that the composite acceleration does not have one peak within the one curve, an acceleration correction value such that the composite acceleration has one peak; and
set a magnitude of the longitudinal acceleration to a predetermined ratio to the lateral acceleration based on the acceleration correction value.

2. The vehicle motion control device according to claim 1, wherein the controller is further configured to plan a longitudinal acceleration and a lateral acceleration whose composite jerk that is a temporal change in the composite acceleration has a minimum peak value.

3. The vehicle motion control device according to claim 1, wherein the controller is further configured to correct an acceleration generated in the vehicle so as to be not more than an upper limit value of a vehicle behavior.

4. The vehicle motion control device according to claim 1, wherein the composite acceleration is a magnitude of a resultant vector of the longitudinal acceleration and the lateral acceleration.

5. The vehicle motion control device according to claim 1, wherein a peak of the composite acceleration is a maximum value of the composite acceleration generated when the vehicle travels on each curve.

6. The vehicle motion control device according to claim 1, wherein the curve is a section sandwiched between inflection points on the target course.

7. The vehicle motion control device according to claim 1, wherein the controller is further configured to plan a plurality of target speed candidates and selects a target speed according to a traveling mode from the plurality of target speed candidates.

8. The vehicle motion control device according to claim 7, wherein the controller is further configured to select a target speed corresponding to a shortest moving time from the plurality of target speed candidates when the traveling mode is a shortest time mode.

9. The vehicle motion control device according to claim 7, wherein the controller is further configured to select a target speed corresponding to a minimum energy consumption from the plurality of target speed candidates when the traveling mode is an economy mode.

10. A vehicle motion control method for controlling a motion of a vehicle by an electron control unit (ECU), comprising:
  a first step of generating traveling status information of the vehicle;
  a second step of generating a target course based on the traveling status information;
  a third step of planning a target speed by calculating a longitudinal acceleration and a lateral acceleration when the vehicle travels on each curve in the target course; and
  a fourth step of controlling driving, braking, and steering of the vehicle based on the target course and the target speed,
  wherein the third step includes:
  an acceleration determination step of determining, based on the traveling status information, the target course and a vehicle behavior prediction value, whether or not there is one peak in the composite acceleration, which is a combination of the longitudinal acceleration and the lateral acceleration, when traveling on one curve and output a result of the determination; and
  an acceleration correction step of calculating, only when the result of the determination indicates that the composite acceleration does not have one peak within the one curve, an acceleration correction value such that the composite acceleration has one peak; and
  an acceleration setting step of setting a magnitude of the longitudinal acceleration to a predetermined ratio to the lateral acceleration based on the acceleration correction value.

* * * * *